Figure 5:
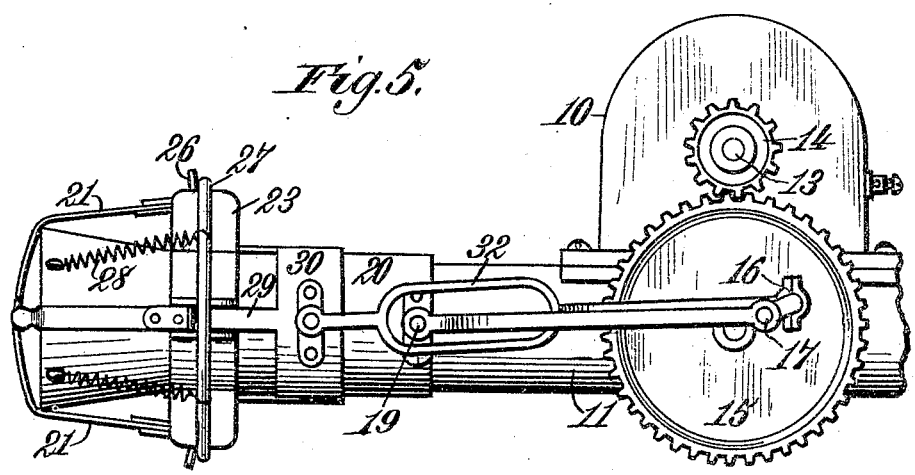

No. 773,357. PATENTED OCT. 25, 1904.
J. W. WEBB.
COTTON PICKING OR HARVESTING MACHINE.
APPLICATION FILED JUNE 16, 1904.
NO MODEL. 4 SHEETS—SHEET 1.
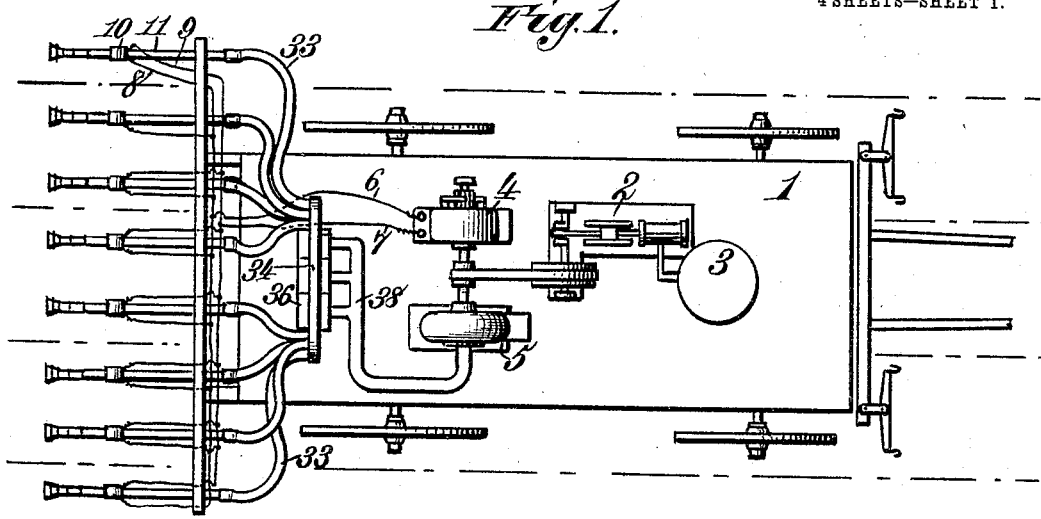
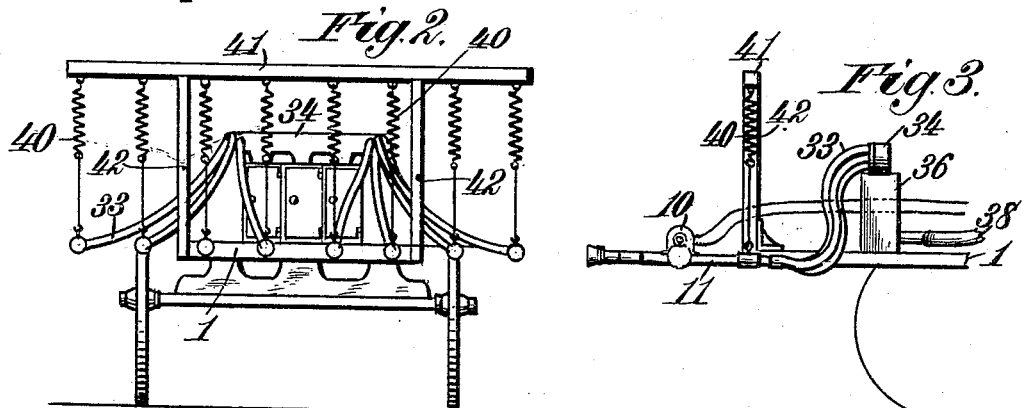
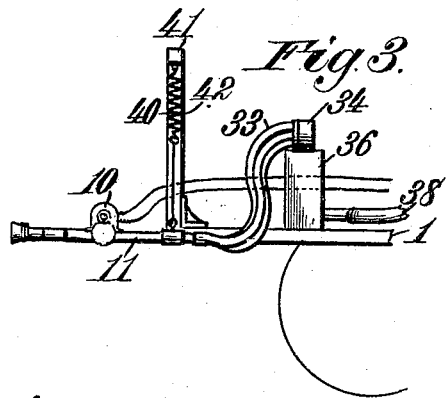
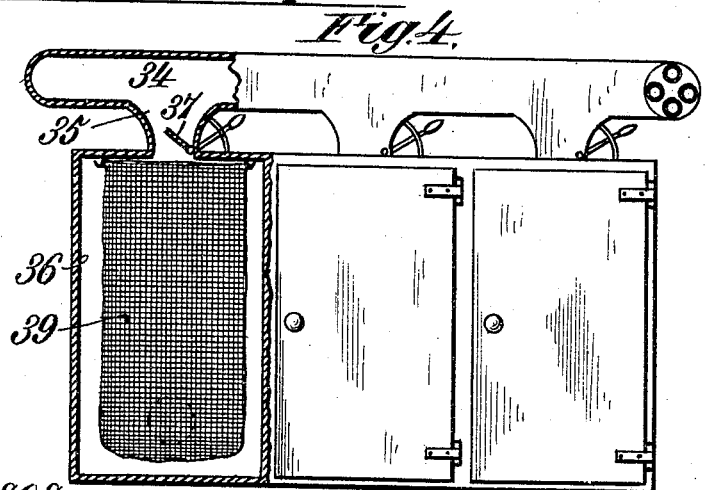
Witnesses.
Robert Cruitt,
George J. Bean.
Inventor.
John W. Webb,
by his Attorneys.

No. 773,357. PATENTED OCT. 25, 1904.
J. W. WEBB.
COTTON PICKING OR HARVESTING MACHINE.
APPLICATION FILED JUNE 16, 1904.
NO MODEL. 4 SHEETS—SHEET 2.

Witnesses:
Robert Cratt
George T. Bean

Inventor:
John W. Webb
by W. Henderson
Attorney

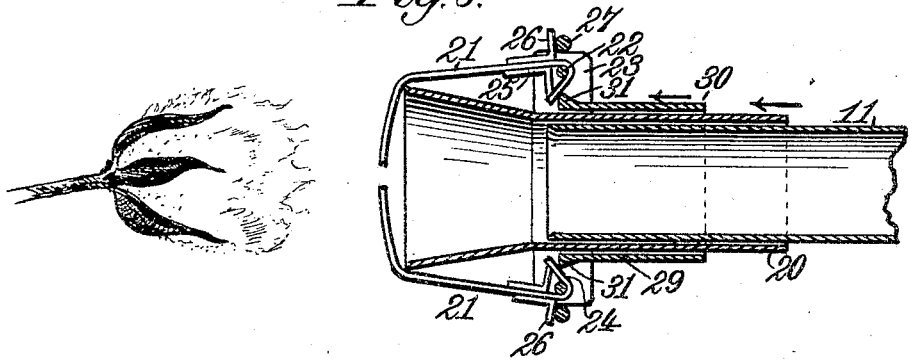
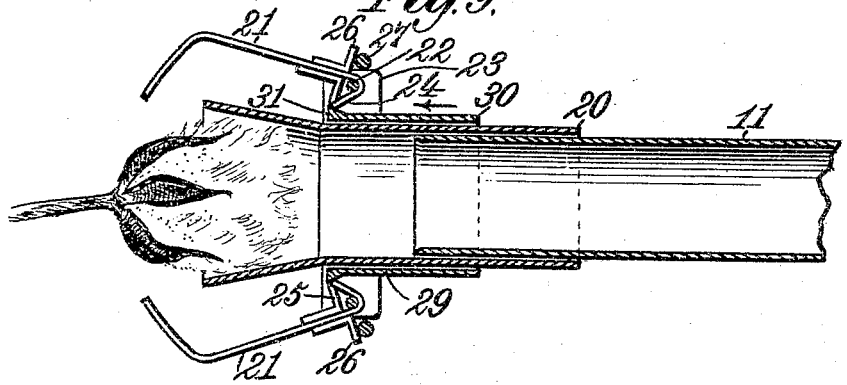
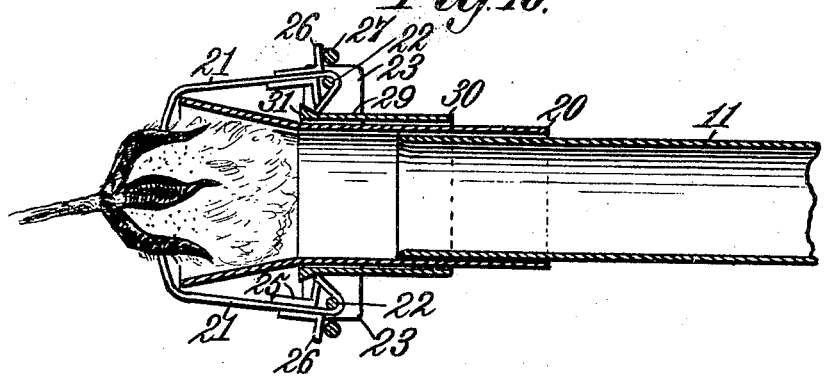

No. 773,357. PATENTED OCT. 25, 1904.
J. W. WEBB.
COTTON PICKING OR HARVESTING MACHINE.
APPLICATION FILED JUNE 16, 1904.
NO MODEL. 4 SHEETS—SHEET 4.
*Fig. 11.*
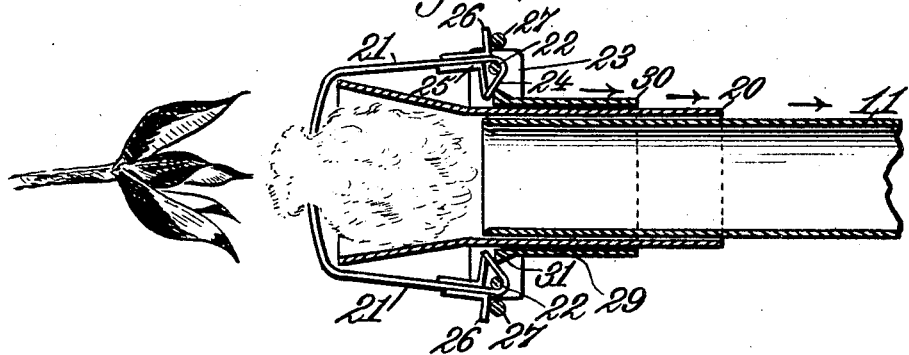
*Fig. 12.*
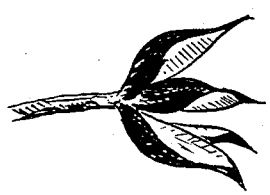 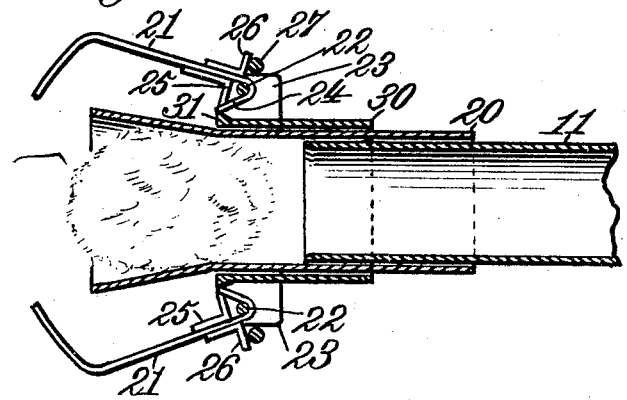
*Fig. 13.* *Fig. 14.*
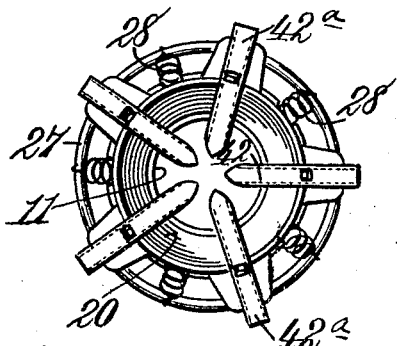 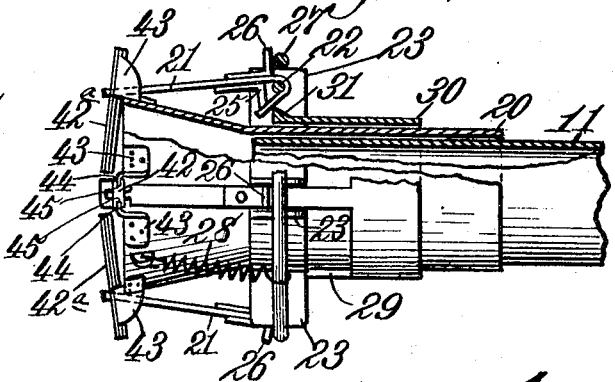
Witnesses.
Robert Everitt,
George T. Bean.
Inventor.
John W. Webb,
by his Attorney.

No. 773,357.

Patented October 25, 1904.

UNITED STATES PATENT OFFICE.

JOHN W. WEBB, OF GREENVILLE, MISSISSIPPI.

COTTON PICKING OR HARVESTING MACHINE.

SPECIFICATION forming part of Letters Patent No. 773,357, dated October 25, 1904.

Application filed June 16, 1904. Serial No. 212,808. (No model.)

*To all whom it may concern:*

Be it known that I, JOHN W. WEBB, a citizen of the United States, residing at Greenville, in the county of Washington and State of Mississippi, have invented certain new and useful Improvements in Cotton Picking or Harvesting Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a machine for picking or harvesting cotton, and comprises generally a wheeled vehicle carrying a small engine operating a dynamo and a suction-creating fan, the dynamo being suitably connected with a number of electrically-operated motors mounted upon a corresponding number of tubes, each tube being provided with a sliding cotton-picker head and each head carrying cotton-picking fingers periodically actuated by means carried by the sliding picker-heads, said means and the picker-heads being operated by the electric motor carried by the tube.

The machine also comprises a vacuum box or boxes in which a suction is created by the suction-fan and with which box or boxes the tubes of the cotton-picker heads communicate, so that as the pickers take the cotton from the bolls the cotton will be drawn through the tubes into the vacuum box or boxes and there deposited in suitable bags supported therein for the purpose, and from any one of which vacuum-boxes communication may be cut off between the same and the tubes, so as to permit the bag which receives the cotton to be removed from the box or boxes without interfering with the work of the other parts of the machine.

The invention has for its object to provide such a machine as that just described in general terms in which the several parts will cooperate, so that the cotton-picker heads will be automatically moved toward the cotton-bolls, so that the picker-fingers may grasp the cotton at the base of the boll and then be automatically retracted, so as to pull the cotton from the boll and then release their grip upon the cotton, so that the suction created by the suction-fan will draw the cotton through the tubes into the vacuum or suction box, whereby the cotton will be detached from the bolls without breaking the bolls or portions of the plant and without carrying any foreign matter with the cotton through the tubes and in which a greater quantity of cotton can be picked in less time and with the employment of less labor than heretofore.

To the accomplishment of the foregoing and such other objects as may hereinafter appear the invention consists in the features of construction and in the combination of parts hereinafter particularly described and then sought to be clearly defined by the claims, reference being had to the accompanying drawings, forming a part hereof, and in which—

Figure 6:
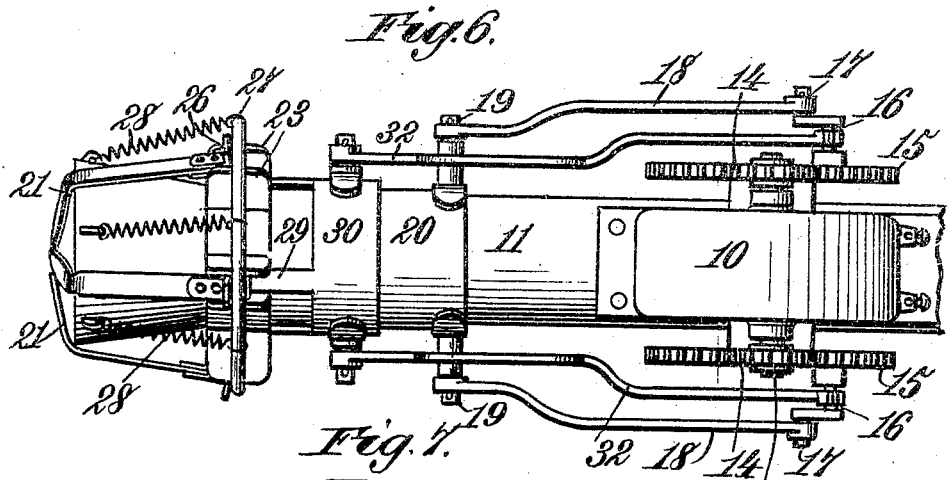
Figure 7:
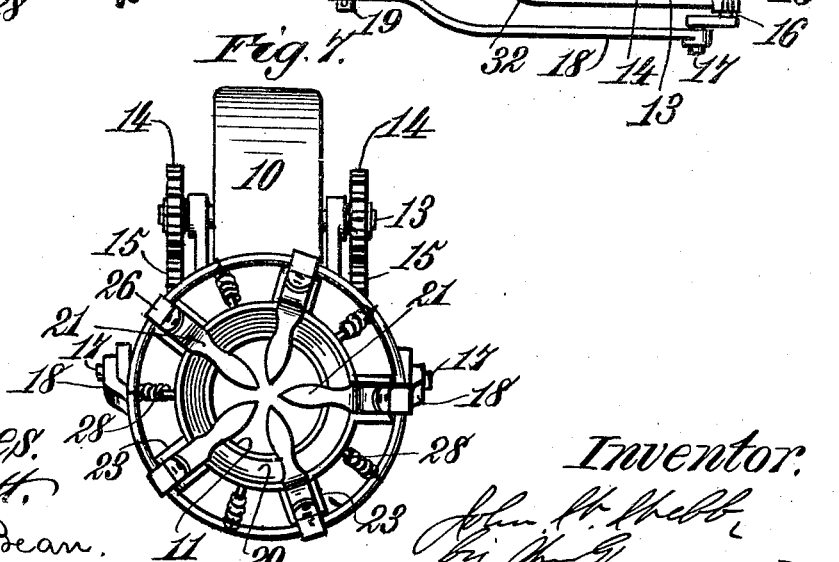

Figure 1 is a plan view of a machine embodying my invention. Fig. 2 is a front elevation of the same. Fig. 3 is a side elevation of a portion of the machine. Fig. 4 is a side elevation of the vacuum-boxes and of the vacuum-trunk in communication with the same, one of the boxes being in vertical section, and a portion of the vacuum-trunk broken away. Fig. 5 is a side view of one of the tubes carrying its electric motor and provided with the sliding picker-head, the picker-fingers, and means for actuating the latter. Fig. 6 is a plan view of Fig. 5. Fig. 7 is an end view looking from the front of Fig. 6. Fig. 8 is a vertical section of the picker-head approaching the cotton-boll and with parts in position ready to open. Fig. 9 is a similar view showing the picker-head after it has reached the boll and with fingers open. Fig. 10 is a similar view showing position of the parts after the fingers have grasped the cotton. Fig. 11 is a similar view showing position of the parts after the fingers have grasped the cotton and the head pulled back, detaching the cotton from the boll. Fig. 12 is a similar view showing position of the parts after the head has been drawn back and the fingers opened to release the cotton, which is whipped back by suction through the tube. Fig. 13 is a front end view of the picker-head with a modified form of picker-finger, and Fig. 14 a vertical section through the picker-head having the modified fingers.

In the drawings the numeral 1 designates the wheeled vehicle, which may be drawn by horses and which is provided with a gasolene-engine 2, to which the gasolene is supplied from a tank 3, said engine being coupled to the shaft of a suitable dynamo 4 and a suitable suction-fan 5, from which dynamo wires 6 and 7 lead to and connect with the wires 8 and 9, which conduct the current to a suitable electric motor 10, supported upon a tube 11, there being provided any desired number of tubes and each tube being provided with its electric motor connected with the dynamo, as described. For purposes of illustration I have illustrated eight of the tubes 11; but the number may be varied, and as the motor of each tube will be the same the illustration and description of the parts of one motor will answer for all. The motor may be of any approved pattern, and to its shaft 13 will be attached the gear-wheels 14, which will mesh with gear-wheels 15, which will drive the cranks 16 and 17 or their equivalents. From the cranks 17 lead the rods or pitmen 18, which are connected by pins 19 with a sliding picker-head 20, sleeved to the tube 11, which picker-head carries picker-fingers 21 of any suitable construction and arrangement to be periodically opened and closed at the proper times to grasp the cotton on the boll and to release the same after it is detached from the boll. A suitable construction and arrangement of picker-fingers for the purpose I have illustrated in the drawings, and, as illustrated, each finger 21 is hinged or pivoted by a pin 22, carried by ears 23, supported by the picker-head 20. Each finger has a heel 24, which may be braced by a plate 25, and on the top of each finger is a flange 26. A series of these fingers are arranged around the picker-head, and an encircling ring 27 bears against the flanges 26 and is connected by spiral springs 28 with the forward end of the picker-head, so as to hold the picker-fingers normally closed. These fingers are automatically opened by extensions 29 of a collar 30, slidably mounted on the picker-head 20, said extensions working between the ears 23, so as to bear against the heels 24 of the picker-fingers and lift the fingers, so as to cause them to open in the forward movement of the extensions, and said extensions are formed with inclined faces 31, which bear against the ends of the heels in the backward movement of the extensions, so that the extensions may easily pass to the rear of the heels and into position to open the fingers on the next forward movement of the collar carrying these extensions. The collar 30, to which the extensions 29 are connected, is reciprocated on the sliding picker-head 20 by means of the rods or pitmen 32, which connect the sliding collar 30 to the cranks 16, driven by the gear-wheels 15. The cranks 16 and 17 are so proportioned that the picker-head 20 will be moved up to the cotton-boll and the collar 30, carrying the extensions 29, at the same time moved forward, so as to open the picker-fingers to the position shown in Fig. 9 of the drawings. As soon as the forward ends of the extensions 29 pass beyond the end of the heels 24 of the fingers the springs 28, to which is attached the ring 27, will retract and throw the fingers 21 down, so that they will grasp the cotton close up to the boll, which will be done before the picker-head begins its backward movement. As soon as the fingers have taken their position on the cotton near the base of the boll the picker-head then begins its backward movement, so as to pull the cotton from the boll, and when pulled from the boll and the fingers again open and release the cotton the suction in the tube draws the cotton through the tube toward the suction or vacuum box. In this way the sliding picker-head moves the fingers into position to grasp the cotton near the base of the locks of cotton and the fingers take their hold upon the cotton before the retraction of the picker-head and the pulling action on the cotton begins, so that the pulling action begins after the fingers have taken their position close to the base of the cotton-boll. Thus it will be observed that there are three distinct movements: first, the forward movement of the picker-head to bring the picker-fingers to the proper position, then the closing of the fingers to grasp the cotton close to the base of the cotton-boll, and then the retracting and pulling action on the cotton. This results in the perfect separation of the cotton from the boll without leaving any of the cotton attached to the boll and without breaking any part of the boll or plant. This also results in the cotton being delivered in a clearer condition than is the case where particles of the boll and plant are liable to be broken by the picker and also results in the saving of the cotton, as the cotton is completely detached without leaving particles remaining on the boll.

The tubes 11 at their inner ends connect with flexible tubes 33, which lead to a trunk 34, which communicates through necks or openings 35 with the vacuum box or boxes 36, and at such communicating points hand-controlled valves 37 are located, so as to cut off communication between the trunk 34 and any one of the boxes or compartments 36. The box or boxes 36 communicate through a pipe or flue 38 with the suction-fan 5, so that a suction or vacuum is created in the box or boxes 36. This causes the cotton which has been detached from the boll to be conveyed from the pipes 11 through the flexible pipes 33 to the trunk 34 and thence into the box or boxes 36, where it is collected in a bag or other receptacle 39, temporarily sustained therein for the purpose. Under this arrangement when the bag in any compartment is filled that compartment can be cut off from the cotton-picker tubes or heads by closing the valve 37, and while the filled bag is being removed cotton can continue to be drawn into the other box or boxes, and thus the working of the machine will not be interfered with.

The series of tubes 11 which carry the electric motors for operating the picker-heads and their fingers are suspended from a beam of any suitable form supported in any suitable manner from the bed of the machine 1. In the drawings I have illustrated them as suspended by means of elastic supports 40 from a beam 41, which is sustained by uprights 42 from the bed of the machine. This relieves the operators from the weight of the tubes 11 and their attachments and at the same time enables the operator to swing the tubes sidewise or downwardly and also forwardly to the extent desired to meet the conditions prevailing at the time the machine is being operated.

In Figs. 13 and 14 the construction of the parts is the same as the corresponding parts already described, with this difference, that the grasping ends of the fingers are provided with finger-tips 42$^a$, made separate from the shanks of the fingers and in which the shanks loosely fit, so as to permit the finger-tips to be reciprocated with the movement of the shanks of the fingers. These finger-tips are guided in their reciprocation by guides 43, secured to the flaring mouth of the picker-head, said guides having tongues 44, fitting in grooves 45, formed in the edges of the finger-tips, as shown in Fig. 14 of the drawings. This construction gives a straight diagonal thrust or movement to the finger-tips in the movements of the fingers, and for some reasons this may be the preferred form of fingers employed.

Under the employment and arrangement of the parts described an efficient cotton picking or harvesting machine is produced, which will enable a large quantity of cotton to be picked in a day with the assistance of few attendants and at a great saving in cost and time and which also will deliver the cotton in a cleaner and better condition for shipment to the ginnery.

I have illustrated and described with particularity the best means known to me at this time for embodiment in the machine; but I do not confine myself to such details, except where they are specifically claimed, as changes can be made in the details of various parts of the machine and essential features of my invention be retained.

Having described my invention and set forth its merits, what I claim is—

1. In a cotton picking or harvesting machine, a conveyer-tube for the cotton, a sliding cotton-picker head at the end of said tube, picker-fingers carried by said sliding head, means for sliding said head, and means for actuating the picker-fingers, substantially as described.

2. In a cotton picking or harvesting machine, a conveyer-tube for the cotton, a sliding cotton-picker head at the end of said tube, picker-fingers carried by the sliding head, and mechanism for moving forward the sliding head and picker-fingers, opening and closing the fingers, and moving backward the sliding head and fingers after the latter have grasped the cotton on the boll, substantially as described.

3. In a cotton picking or harvesting machine, the conveyer-tube for the cotton, the pivoted picker-fingers each formed with a heel, the ring engaging a part of each finger, the spring drawing the ring against the fingers to keep them normally closed, the collar having a part thereof arranged to engage the heels of the fingers to open them against the tension of the springs, and means for moving the collar back and forth, substantially as described.

4. In a cotton picking or harvesting machine, a conveyer-tube for the cotton, a sliding cotton-picker head at one end of said tube, picker-fingers supported at the end of the tube, a collar loosely mounted on the sliding head and having a part thereof arranged to engage with the picker-fingers, a motor, and rods or pitmen connecting the picker-head and said collar, respectively, with the drive-shaft of the motor for moving the head and collar, substantially as described.

5. In a cotton picking or harvesting machine, a conveyer-tube for the cotton, a sliding cotton-picker head and picker-fingers at the end of said tube, a motor mounted on the tube, and connections between the motor and sliding head and picker-fingers for actuating the head and fingers, substantially as described.

6. In a cotton picking or harvesting machine, a conveyer-tube for the cotton, picker-fingers carried by the tube, a motor mounted on the tube, connections between the motor and fingers for actuating the latter, a vacuum or suction box, with which said conveyer-tube is in communication, a suction-fan for creating a vacuum in said box, a dynamo for driving the motor carried by the tube, and an engine for driving said dynamo and actuating the suction-fan, substantially as described.

7. In a cotton picking or harvesting machine, a suction or vacuum box, comprising independent compartments, cotton-conveyer tubes in communication with the compartments of said box and provided at one end with picking-fingers, means communicating with the lower portion of the compartments for creating a suction or vacuum in the several compartments of the box, and means for preventing the inflow of cotton into one of the compartments of the box while permitting its inflow into another compartment, substantially as described.

8. In a cotton picking or harvesting machine, a suction or vacuum box, a trunk in communication with said box, cotton-conveyer tubes in communication with said trunk, each tube being provided with picker-fingers, and means communicating with the lower portion of the vacuum-box for sucking the cotton from the series of tubes into the trunk and from thence into the box, substantially as described.

9. In a cotton picking or harvesting machine, a suction or vacuum box, cotton-conveyer tubes in communication with said box and provided at one end with picker-fingers, means for creating a suction or vacuum in the box, and flexible means sustaining the tubes from a suitable support, substantially as described.

In testimony whereof I affix my signature in presence of two witnesses.

JOHN W. WEBB.

Witnesses:
JAMES B. HODGKIN,
J. L. COX.